MAGNETIC RECORDING METHOD

Filed Dec. 31, 1951 2 Sheets-Sheet 1

INVENTOR
BYRON E PHELPS

By

John B. Sponsler
AGENT

Dec. 18, 1956 B. E. PHELPS 2,774,646

MAGNETIC RECORDING METHOD

Filed Dec. 31, 1951 2 Sheets-Sheet 2

INVENTOR
BYRON E. PHELPS

By John B. Sponsler
AGENT

United States Patent Office 2,774,646

Patented Dec. 18, 1956

2,774,646

MAGNETIC RECORDING METHOD

Byron E. Phelps, Poughkeepsie, N. Y., assignor to International Business Machines Corporation, New York, N. Y., a corporation of New York Application December 31, 1951, Serial No. 264,341

8 Claims. (Cl. 346—74)

This invention relates to circuits and apparatus for magnetically recording data upon a magnetizable medium such as a steel wire or tape. More particularly the invention is concerned with an improved and simplified means and the method incorporated therein for obtaining the recording of discrete pulses whereby a relatively large number of pulses can be recorded within a minute length of a magnetic tape, or the like, without encountering flux fringes and interference between successive recorded pulses.

The principal object of this invention is therefore to provide magnetic recording apparatus for storing large amounts of data within a relatively short length of the storage medium.

A further object of this invention is to provide a simplified apparatus and method of recording discrete magnetic pulses wherein a minimum number of control or phasing circuits is employed.

A still further object of this invention is to provide magnetic recording apparatus wherein the magnetic data is recorded in the form of a continuous pattern representative of data representations identifiable merely by a reversal of the direction of the magnetic flux.

Figures 1, 2:
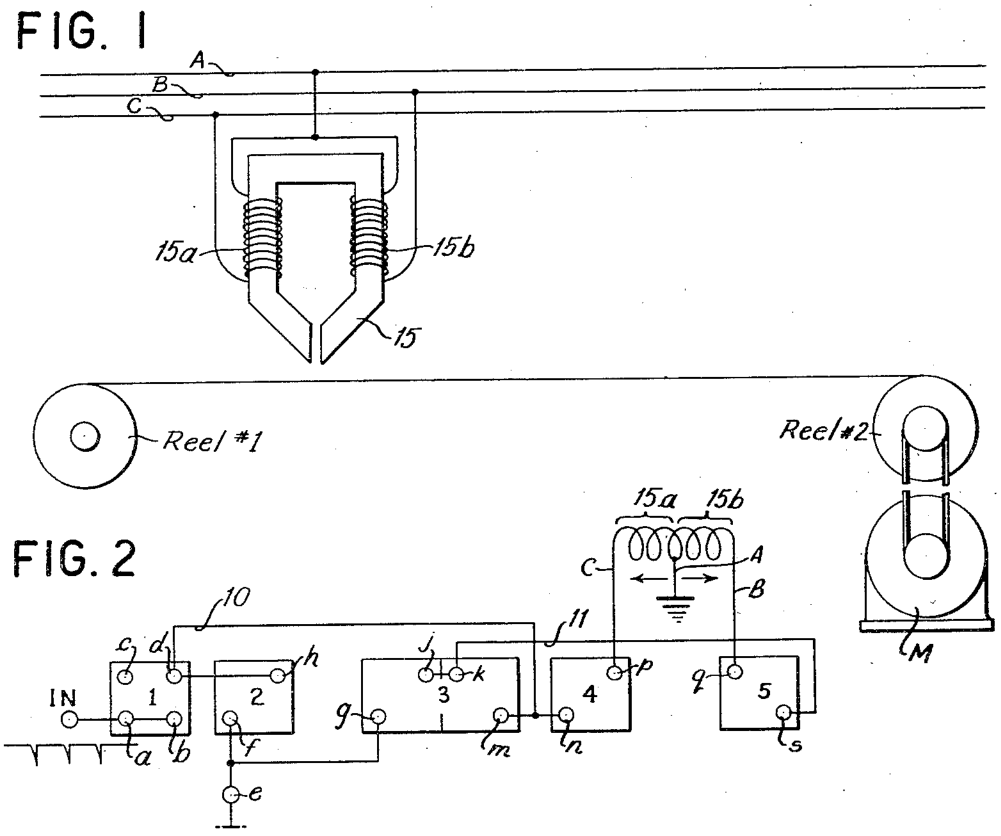
Figure 3:
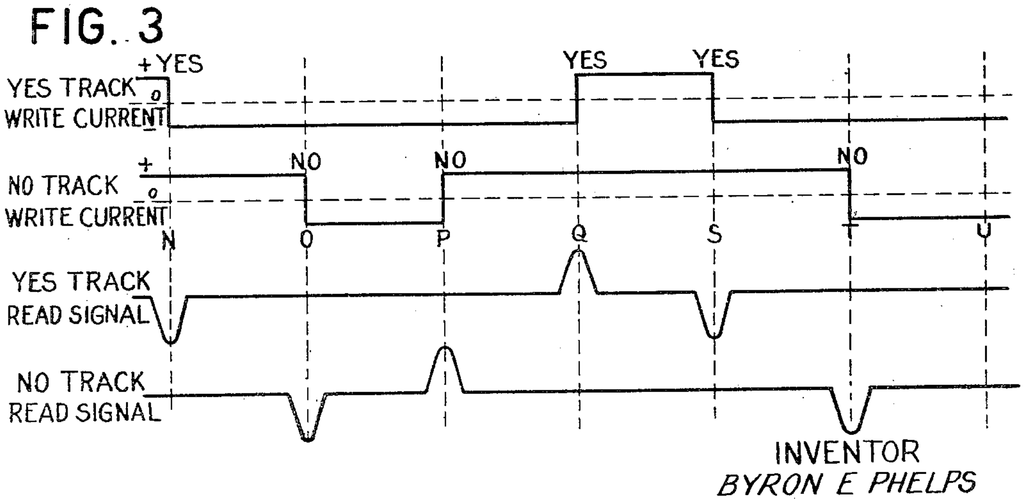
Figure 4:
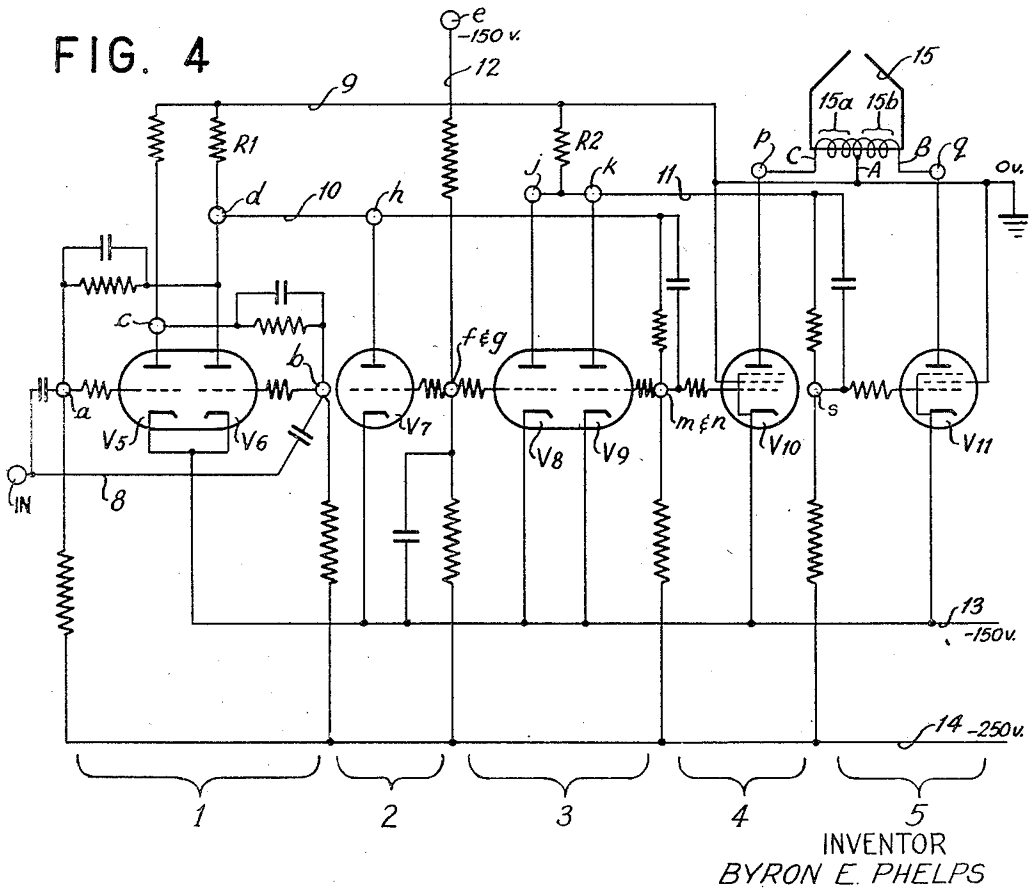

Other objects of the invention are apparent from the specification which follows and from the accompanying drawings, which comprise:

Fig. 1, showing diagrammatically a form of magnetic recording head and a magnetic tape reeling and unreeling arrangement;

Fig. 2, illustrating the components of the apparatus in block diagram form;

Fig. 3, illustrating the pattern of recordings along a length of magnetic tape, together with the corresponding diagrammatic pattern of magnetically induced impulses derived from the sensing or reading apparatus;

Fig. 4, showing the circuit arrangement preferred for recording; and

Figure 5:
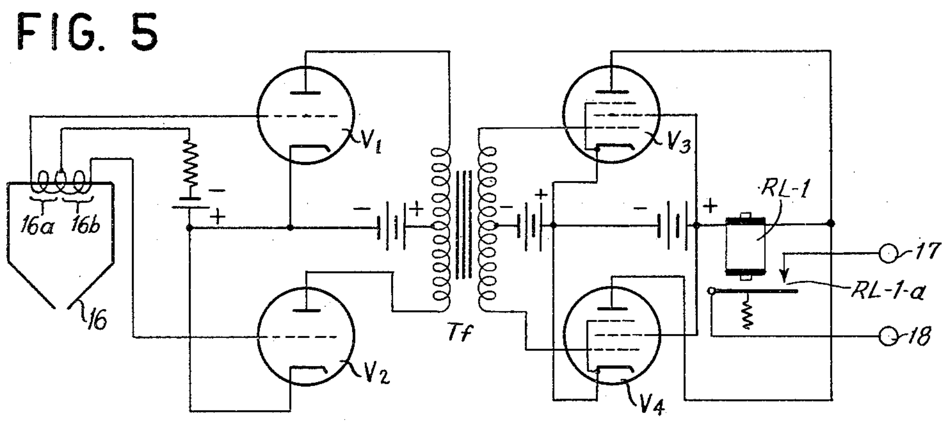

Fig. 5, showing a circuit arrangement suitable for sensing or reading the stored magnetic data.

Now referring to Fig. 1, a U-shaped magnetic core is provided with a pair of windings 15*a* and 15*b*. The core 15 may be of any conventional type having an air gap in close proximity to a tape or other magnetizable medium which is moved past the recording head 15, or core, at a specified rate from a supply reel, Reel #1, to a take-up reel, Reel #2, or vice versa, the take-up reel being driven by a motor, M. The windings 15*a* and 15*b* are arranged to be connected in common to line A, the other connection to winding 15*a* being connected to line C, and the other connection to winding 15*b* being connected to line B. It is to the lines A, B, and C that the output current of the recording circuit is fed, which output circuit is hereinafter described in detail. In brief when recording current flows in winding 15*a* magnetic flux of one direction flows across the air gap of the core 15, and when recording current flows in winding 15*b* magnetic flux is generated across the air gap of core 15 in the other direction.

With reference to Figs. 2 and 4, the circuit arrangement constituting a preferred embodiment of the invention is best illustrated. For convenience of reference the block diagram of Fig. 2 has been numbered with reference to each block component to correspond with the numbered brackets found under the circuit diagram of Fig. 4. Furthermore the essential interconnections between the block components of Fig. 2 have been duplicated in lower case alphabetical characters in the circuit of Fig. 4.

In Figs. 2 and 4 therefore, the block 1 represents a trigger circuit of conventional design similar to the well known Eccles-Jordan circuit, having two stable states, wherein each negative pulse input causes a shift in the side of conduction. More explicitly, referring to Fig. 4, and assuming that the triode V5 is conducting, when a negative input pulse is applied to the terminal IN, the trigger circuit will shift so that the triode V6 will become conductive and the triode V5 will become non-conductive. Similarly, when the next negative pulse is applied to the terminal IN, triode V5 will again become conducting and triode V6 will become non-conducting. The block 2 is a conventional inverter circuit, and the block 3 is a further pair of inverter circuits. The block 2 inverter and the triode V6 have a common plate resistor R1 so that whenever the input to the inverter (triode V7) is positive, or when triode V6 is conducting, a voltage drop will be reflected in line 10. Similarly triodes V8 and V9 forming a pair of inverters of block 3 have a common plate resistor R2 so that when a positive potential is applied to the input of either V8 or V9 a voltage drop will be reflected in line 11. The lines 10 and 11, respectively, feed the control grids of the pentode drivers V10 (block 4) and V11 (block 5). In other words a positive potential to the input of V10 will cause anode current of V10 to energize the winding 15*a*, and a positive potential to the input of V11 will cause anode current of V11 to energize the winding 15*b*. Consequently the direction of flux of the recording head or core 15 is controlled by the rise and fall of potential in the lines 10 and 11, respectively.

Normally, referring to Fig. 4, potentials are applied for recording as follows: Line 9 (ground) zero volts, line 12 minus 150 volts, line 13 minus 150 volts, and line 14 minus 250 volts. With these potentials applied, let it be assumed that the triode V5 of the trigger circuit of block 1 is conducting. Line 10 will therefore reflect a positive potential which will be applied to the control grids of triode V9 and pentode V10. Anode current of V10 will therefore flow in the winding 15*a* and the recording head or core 15 will have flux generated in one direction capable of recording upon a tape or similar medium as previously explained with reference to Fig. 1. At the same time, since V9 is conducting a negative potential will be reflected in line 11 so that the pentode V11 will be cut off from conducting and no anode current of V11 will flow in the winding 15*b*.

When, under the conditions just enumerated, a negative pulse is applied to the terminal IN of block 1 the trigger circuit thereof, previously described, will shift to its other conductive state; namely, V5 triode will become non-conductive and V6 triode will become conductive. Line 10 will therefore reflect a negative potential which will cut off the anode current of V10 and recording current will no longer flow in winding 15*a*. At the same time the negative potential reflected in line 10 will cut off triode V9 (inverter or block 3) and a positive potential will be reflected in line 11 so that pentode V11 will conduct and its anode current will flow in the winding 15*b* producing flux in the recording head or core 15 in the opposite direction to that produced by winding 15*a* as previously explained. Normally, therefore, depending upon the state of conduction of the trigger of block 1, that is whether V5 or V6 is conducting, determines the direction of the flux generated in the recording head or core 15. A negative pulse applied to the IN terminal will reverse the stable state of the trigger and simultaneously reverse the direction of flux produced by the recording head 15. Flux in one direction or the other is therefore produced by the recording head 15, under the conditions set forth above, constantly.

When it is desired to cut off the recording of flux in either direction, the application of zero potential or of positive potential to line 12 will cause both the triodes V7 and V8 to become conducting therefore reflecting negative potentials in both lines 10 and 11 driving the control grids of both V10 and V11 negative so that anode current flows in neither V10 nor V11 and no excitation current flows in either winding 15*a* or 15*b* to produce flux in the recording head 15.

Now referring to Fig. 3, and particularly to the uppermost diagram thereof, there is represented the recording pattern of one magnetic tape, or of a single channel of a multiple channel magnetic tape, as recorded by the method and apparatus described above, following along recording intervals N, O, P, Q, S, T, U. Let it be assumed that the trigger of the circuit of Fig. 4 is in one of its states of stability and that negative potential (minus 150 volts) has been applied to line 12, as previously explained. At the interval N a negative pulse is applied to the terminal IN. Immediately thereafter a reversal of magnetic flux occurs, and the tape continues to be magnetized in that direction through the intervals O and P until another negative impulse is applied to the terminal IN causing another reversal of flux at interval Q, and a similar reversal brought about in the same way at S, whereafter the direction of the flux remains unchanged since no further pulses are applied to the terminal IN. Referring to the next to the bottom diagram of Fig. 3, the corresponding sensing or reading pulses obtained by passing the tape over a conventional magnetic reading head would be obtained. In the present invention, however, there is no need for the determination of direction, but that there is a change of direction. Current flows in the recording head at all times normally, but each time any data is to be recorded in the tape the current is reversed, the direction of the reversal being immaterial. Where a binary representation is desired to be recorded two separate tapes, two recording heads, and two recording circuits are provided similar to that described above. Thus, the current is reversed in the "yes" track each time a "yes" is recorded, and the current is reversed in the "no" track each time a "no" is recorded, wherein the "yes" and "no" connotation is representative of a binary system of recording. Each of these tracks, or tapes can be read or sensed by a conventional push-pull amplifier sensing or reading circuit such as illustrated in Fig. 5, wherein a readout or sensing head having the opposed windings 16*a* and 16*b* is fed into a pair of triodes V1 and V2 arranged to feed in push-pull a pair of power pentodes V3 and V4. The common return anode circuit of the pentodes V3 and V4 may include a relay RL–1 having a pair of contacts RL–1*a* which close each time any reversal of magnetic flux is encountered by the air gap of the reading or sensing head 16 so that a circuit is closed between the terminals 17 and 18. Other similar circuits may also be used for reading out indiscriminately of the direction of the flux change which is sensed.

It is therefore apparent that the present invention provides a simple, effective, and accurate method of recording discrete impulses upon a magnetic medium, the apparatus being fully integrated without additional controls for the determination of flux direction. It is immaterial in the instant invention whether the recordings are in one direction or the other, and since a total reversal of flux is brought about for each recording, the only indication required for reproduction is that a change of flux has been produced. It has been found that this method is capable of recording up to 1000 recordings per inch of magnetic tape with reliable and accurate readout results.

Since all of the circuit components are of conventional design; viz., trigger circuits, inverters, drivers, etcetera, no circuit parameters have been given, it being well within the province of one skilled in the art to provide such well known component features.

While the specification by way of illustration has described a preferred embodiment as reflected by the drawings, the scope of the invention is in no way intended to be limited thereby except as set forth in the accompanying claims, which follow:

I claim:

1. Apparatus for receiving and recording successive time displaced discrete intelligence pulses on a moving magnetic record medium, including in combination: a moving magnetic record medium; first controllable means for continuously generating either a magnetic flux of a first polarity or of a second polarity opposite to said first polarity on said and record medium; second means for controlling said first controllable means to change the magnetic flux polarity on said magnetic recording medium from either said first polarity of magnetization to said second polarity of magnetization, or vice versa, upon receipt of each one of said intelligence pulses, whereby each intelligence pulse is represented on said magnetic record medium solely by a change in either direction of the polarity of magnetization of said magnetic record medium.

2. Apparatus for recording successive time displaced discrete intelligence pulses on a moving magnetic record medium; first controllable means for continuously generating either a magnetic flux of a first polarity or of a second polarity opposite to said first polarity and which are respectively recorded on said record medium; second means for accepting said successive time displaced discrete intelligence pulses; and control means interconnecting said first and second means for controlling said first means to change the magnetic flux polarity impressed on said magnetic recording medium successively from either said first polarity of magnetization to said second polarity of magnetization, or vice versa, successively, upon receipt by said second means of each one of said intelligence pulses, whereby each intelligence pulse is represented on said magnetic record medium solely by a change in either direction of the polarity of magnetization of said magnetic record medium.

3. Apparatus for magnetically recording a pulse train, said apparatus including in combination: a moving magnetizable record medium adapted to assume a first polarity of magnetization and a second polarity of magnetization opposite to said first polarity of magnetization; circuit means for accepting said pulse train; and magnetic recording means responsive to the acceptance of pulses of said pulse train by said circuit means for causing said record medium to change its polarity of magnetization once for each pulse accepted by said circuit means, whereby each of the pulses of said pulse train is magnetically recorded solely by a single change in the polarity of the magnetization of said magnetizable medium.

4. Apparatus for accepting and magnetically recording *n* successive time displaced discrete intelligence pulses: a moving magnetic record medium; first energizable means for subjecting said magnetic record medium to a flux of a first polarity; second energizable means for subjecting said magnetic record medium to a magnetic flux of a second polarity opposite to said first polarity; third controllable means for causing said first means to be energized by a first pulse accepted for recording; fourth controllable means for causing said second means to be energized by a second pulse accepted for recording; and additional means for continuously controlling said third and fourth means in this alternate manner, whereby each of said $n$ pulses is magnetically recorded solely by a single change in the polarity of the magnetic flux to which said magnetic record medium is subjected.

5. Apparatus for magnetically recording a pulse train having a plurality of pulse time intervals each pulse of said train occurring during a discrete pulse time interval, said apparatus including in combination: a moving magnetizable record medium adapted to be magnetized only with a flux of a first polarity or a flux of a second polarity opposite to said first polarity; controllable magnetic recording means for continuously magnetizing said record medium with a flux of said first polarity or a flux of said second polarity; circuit means for accepting said pulse train; and control means for controlling said magnetic recording means to cause said record medium to be magnetized alternately by a flux of said first polarity and then by a flux of said second polarity, or vice versa, successively and respectively in response to each pulse of said pulse train, whereby each change in either direction, of the polarity of the magnetic flux recorded on said record medium is a magnetic recording of a single pulse of said pulse train.

6. Apparatus for magnetically recording discrete information pulses each pulse occurring during a time displaced discrete pulse time interval: a moving magnetic record medium; controllable magnetic recording means for continually causing said magnetic record medium to be magnetized with a first polarity of magnetization or a second polarity of magnetization opposite to said first polarity of magnetization; circuit means for accepting said pulses; and additional means connected to said circuit means and controlling said controllable magnetic recording means for causing the polarity of magnetization of said record medium to change once for each pulse accepted by said circuit means, whereby each pulse is magnetically recorded solely by a single change in the polarity of magnetization of said record medium, from either said first polarity to said second polarity, or vice versa.

7. Apparatus for magnetically recording a binary pulse train having a plurality of time displaced pulse time intervals and wherein each pulse is representative of a binary 0 and occurs during a discrete time displaced pulse time interval and the absence of a pulse during any time displaced pulse time interval is representative of a binary 1, said apparatus including in combination: a moving magnetizable record medium adapted to be magnetized by a flux of a first polarity and to suddenly be magnetized by a flux of a second polarity opposite to that of said first polarity; circuit means for accepting said pulse train; controllable magnetic recording means for continuously magnetizing said record medium with a flux of said first polarity or a flux of said second polarity; and control means connected to said circuit means and controlling said controllable magnetic recording means for causing a single sudden change in the polarity of the flux of said record medium in response to each pulse accepted by said circuit means, whereby said magnetizable record medium will be subjected to a magnetic flux of opposite polarity in response to each successive pulse of said pulse train.

8. Apparatus for magnetically recording a binary pulse train having a plurality of time displaced pulse time intervals and wherein each pulse is representative of a binary 1 and occurs during a discrete time displaced pulse time interval and the absence of a pulse during any time displaced pulse time interval is representative of a binary 0, said apparatus including in combination: a moving magnetizable record medium adapted to be magnetized by a flux of a first polarity and to suddenly be magnetized by a flux of a second polarity opposite to that of said first polarity; circuit means for accepting said pulse train; controllable magnetic recording means for continuously magnetizing said record medium with a flux of said first polarity or a flux of said second polarity; and control means connected to said circuit means and controlling said controllable magnetic recording means for causing a single sudden change in the polarity of the flux of said record medium in response to each pulse accepted by said circuit means, whereby said magnetizable record medium will be subjected to a magnetic flux of opposite polarity in response to each successive pulse of said pulse train.

References Cited in the file of this patent

UNITED STATES PATENTS

| | | |
|---|---|---|
| 2,436,829 | Roth | Mar. 2, 1948 |
| 2,488,277 | Falke | Nov. 15, 1949 |
| 2,540,654 | Cohen et al. | Feb. 6, 1951 |
| 2,611,813 | Sharpless | Sept. 23, 1952 |
| 2,614,169 | Cohen | Oct. 14, 1952 |